Patented Oct. 3, 1939

2,174,568

UNITED STATES PATENT OFFICE 2,174,568

4,5-DICHLORO-PHTHALONITRILE AND PROCESS OF MAKING IT

John Stanley Herbert Davies and William Owen Jones, Blackley, Manchester, England, assignors to Imperial Chemical Industries Limited, a corporation of Great Britain No Drawing. Original application July 15, 1935, Serial No. 31,524. Divided and this application November 4, 1938, Serial No. 238,826. In Great Britain July 20, 1934

5 Claims. (Cl. 260—465)

This application is a division of our copending application, Ser. No. 31,524, filed July 15, 1935, and relates to certain novel compounds of the phthalonitrile series, as well as to a process of preparing the same.

It is an object of this invention to produce certain novel nuclearly substituted phthalonitriles, such as halogen derivatives. It is a further object of this invention to provide a simple and efficient method for producing the said derivatives. Other and further objects of this invention will appear as the description proceeds.

According to this invention we prepare 4,5-dichloro-phthalonitrile by dehydrating 4,5-dichloro-phthalamide with phosgene in a tertiary nitrogenous organic base, such as the heterocyclic bases or liquid tertiary aromatic amines.

Examples of suitable tertiary nitrogenous liquids are pyridine, including technical pyridine, dimethyl-aniline, diethyl-aniline, and diethyl-o-toluidine. An inert diluent, such as chlorobenzene, toluene or nitrobenzene, may be added with advantage to the tertiary nitrogenous liquid.

The best hitherto known method of making phthalonitrile itself was by dehydrating phthalamide with an excess of boiling acetic anhydride (Jour. Chem. Soc., 1934, 1024); but our process is improved thereover in that it gives better yields, and is generally more readily carried out.

4,5-dichloro-phthalonitrile, like most other phthalonitrile derivatives, is a valuable intermediate for the manufacture of coloring matters. See for example, British Patent No. 410,814.

The following example, in which parts are by weight, illustrates but does not limit the invention.

*Example 1.*—223 parts of powdered 4,5-dichlorophthalamide are suspended in a mixture of 376 parts of dry dimethylaniline and 437 parts of dry chlorobenzene and heated to 70° C. 220 parts of phosgene are passed in with stirring at 70 to 80° C. so that all the phosgene is absorbed, and heating is continued at 70° C. for a further 17 hours. The resulting clear dark solution is cooled and poured onto ice. The precipitated 4,5-dichloro-phthalonitrile is filtered, washed with water and dried at 100° C. The yield is practically theoretical, and the product melts at about 175 to 178° C. (178° C. after one crystallization from ethyl alcohol).

4,5-dichlorophthalonitrile is a new compound, and corresponds to the formula

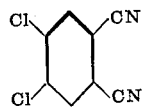

In a similar manner other compounds of the phthalonitrile series may be prepared, provided they do not contain nuclear substituents which are reactive toward phosgene.

The conditions of the reaction may be varied within wide limits, the above examples being merely illustrative. For instance, the reaction temperature may vary widely, say from room temperature up to about 100° C. or higher, depending on the particular phthalamide derivative being converted and on the particular solvent medium employed. The factor to consider here is that at higher temperatures there is an increasing tendency for the phthalamide to decompose into phthalimide and ammonia, thereby diminishing the yield of the desired phthalonitrile. A good rule to follow, therefore, is to conduct the reaction at the highest temperature possible before the formation of phthalimide in substantial quantities sets in. For practical purposes, warming at a moderate temperature, say from about 50 to about 90° C. is sufficient.

Another factor to consider is that the formation of the corresponding phthalimide seems to be encouraged by the presence of moisture in the reaction mass. We therefore recommend using dry initial materials, especially a dried tertiary base.

The quantity of tertiary base may vary within wide limits; but for practical purposes it should not be less than 2 mols per mol of phthalamide treated. The upper limit depends merely on the degree of dilution desired in the reaction mass. Enough of the diluent should be employed to provide a readily stirrable liquid mass. But as seen from the above examples, a great portion of the liquid base may be replaced by non-basic liquids which are inert toward phosgene; for instance, petroleum liquids, trichlorethylene, or the common solvents of the benzene series.

Other variations and modifications will be apparent to those skilled in the art.

In the claims below, it should be understood that by the term "tertiary organic base" we refer to an organic nitrogenous compound in which three of the nitrogen valences are saturated by carbon, this definition including among others the heterocyclic bases.

We claim:

1. The compound 4,5-dichloro-phthalonitrile.

2. A process for the manufacture of 4,5-dichloro-phthalonitrile, which comprises suspending 4,5-dichloro-phthalamide in an organic liquid medium comprising a tertiary organic base, and passing in substantially 2 mols of phosgene at a rate permitting of its continuous absorption, until reaction is no longer observed and recovering the dichloro-phthalonitrile thus produced.

3. A process as in claim 2, the reaction being carried out at a temperature between 50 and 90° C., and the reaction mass then being cooled to crystallize out the phthalonitrile formed.

4. A process as in claim 2, the tertiary base being present in proportion of not less than two molal weights per mol of phthalamide employed.

5. The process of producing 4,5-dichloro-phthalonitrile, which comprises suspending substantially 1 mol of 4,5-dichloro-phthalamide in about 3 mols of dry dimethylaniline contained in an excess, by weight, of dry chlorobenzene; passing in substantially 2.2 mols of phosgene at a rate corresponding with its rate of absorption while maintaining the reaction mass at a temperature of about 70° to about 80° C., then cooling the mass, diluting with water, and recovering the 4,5-dichlorophthalonitrile thus formed.

JOHN STANLEY HERBERT DAVIES.
WILLIAM OWEN JONES.